United States Patent
Heyer et al.

(10) Patent No.: US 10,184,584 B2
(45) Date of Patent: Jan. 22, 2019

(54) MAGNETIC VALVE DEVICE

(75) Inventors: Klaus Heyer, Freiberg (DE); Frank Kaestner, Bietigheim-Bissingen (DE); Erich Ludewig, Bietigheim-Bissingen (DE); Massimiliano Ambrosi, Marbach (DE); Fakheredine Keyrouz, Eindhoven (NL); Rene Schepp, Waiblingen (DE); Norbert Alaze, Markgroeningen (DE)

(73) Assignee: Robert Bosch GmbH, Stuttgart (DE)

( * ) Notice: Subject to any disclaimer, the term of this patent is extended or adjusted under 35 U.S.C. 154(b) by 1507 days.

(21) Appl. No.: 13/518,001

(22) PCT Filed: Nov. 16, 2010

(86) PCT No.: PCT/EP2010/067531
§ 371 (c)(1),
(2), (4) Date: Jun. 20, 2013

(87) PCT Pub. No.: WO2011/076484
PCT Pub. Date: Jun. 30, 2011

(65) Prior Publication Data
US 2014/0048732 A1 Feb. 20, 2014

(30) Foreign Application Priority Data
Dec. 23, 2009 (DE) .................. 10 2009 055 293

(51) Int. Cl.
*F16K 31/06* (2006.01)
*F16K 27/02* (2006.01)
(Continued)

(52) U.S. Cl.
CPC .......... *F16K 31/0658* (2013.01); *B60T 8/363* (2013.01); *B60T 8/3675* (2013.01);
(Continued)

(58) Field of Classification Search
CPC .................. F16K 31/0658; F16K 27/029
(Continued)

(56) References Cited

U.S. PATENT DOCUMENTS

| 5,423,602 A | 6/1995 | Takahashi |
| 5,460,437 A | 10/1995 | Hara |

(Continued)

FOREIGN PATENT DOCUMENTS

| CN | 101161521 A | 4/2008 |
| DE | 10 2005 044 673 A1 | 3/2007 |

(Continued)

OTHER PUBLICATIONS

International Search Report corresponding to PCT Application No. PCT/EP2010/067531, dated Jan. 26, 2011 (German and English language document) (7 pages).

*Primary Examiner* — Kevin Murphy
*Assistant Examiner* — Kelsey Cary
(74) *Attorney, Agent, or Firm* — Maginot, Moore & Beck LLP (57) ABSTRACT

A magnetic valve device includes a valve receiving device and a valve insert of a magnetic valve which is received in the valve receiving device. A high pressure resistance is obtained in one of the modes of embodiment. The magnetic valve device includes either a pressure mechanism configured to press the valve insert against the valve receiving element or a sealing element arranged in a notch in the valve insert or a sealing element arranged between an axial filter and the valve insert.

13 Claims, 9 Drawing Sheets

(51) Int. Cl.
  *B60T 8/36* (2006.01)
  *F16K 1/42* (2006.01)
(52) U.S. Cl.
  CPC .............. *F16K 1/42* (2013.01); *F16K 27/029* (2013.01); *F16K 31/0655* (2013.01)
(58) Field of Classification Search
  USPC ....................... 251/129.02, 129.15, 157, 174
  See application file for complete search history.

(56) References Cited

U.S. PATENT DOCUMENTS

| | | | |
|---|---|---|---|
| 6,659,421 B1* | 12/2003 | Goossens ................. | 251/129.02 |
| 6,994,406 B1* | 2/2006 | Krawczyk et al. ........ | 303/119.2 |
| 2005/0051749 A1* | 3/2005 | Lee .......................... | 251/129.15 |
| 2005/0269538 A1* | 12/2005 | Haynes et al. ........... | 251/129.15 |
| 2007/0051839 A1 | 3/2007 | Tsujimura et al. | |
| 2010/0059698 A1* | 3/2010 | Guggenmos et al. ... | 251/129.15 |

FOREIGN PATENT DOCUMENTS

| | | |
|---|---|---|
| DE | 10 2008 011 259 A1 | 3/2009 |
| EP | 0 670 445 A1 | 9/1995 |
| EP | 1 911 646 A2 | 4/2008 |
| JP | 6-20966 U | 3/1994 |
| JP | 6-193764 A | 7/1994 |
| JP | 6-61638 U | 8/1994 |
| JP | 2005-132347 A | 5/2005 |
| JP | 2006-15876 A | 1/2006 |
| JP | 2007-92988 A | 4/2007 |
| JP | 2007-146914 A | 6/2007 |
| JP | 2007-515596 A | 6/2007 |
| JP | 2008-97321 A | 4/2008 |

* cited by examiner

(Prior Art)

Fig. 5

MAGNETIC VALVE DEVICE

This application is a 35 U.S.C. § 371 National Stage Application of PCT/EP2010/067531, filed on Nov. 16, 2010, which claims the benefit of priority to Serial No. DE 10 2009 055 293.6, filed on Dec. 23, 2009 in Germany, the disclosures of which are incorporated herein by reference in their entirety.

BACKGROUND

The present disclosure relates to a solenoid valve device having a valve receiving device and a valve insert of a solenoid valve which is received in the valve receiving device.

Figure 5:
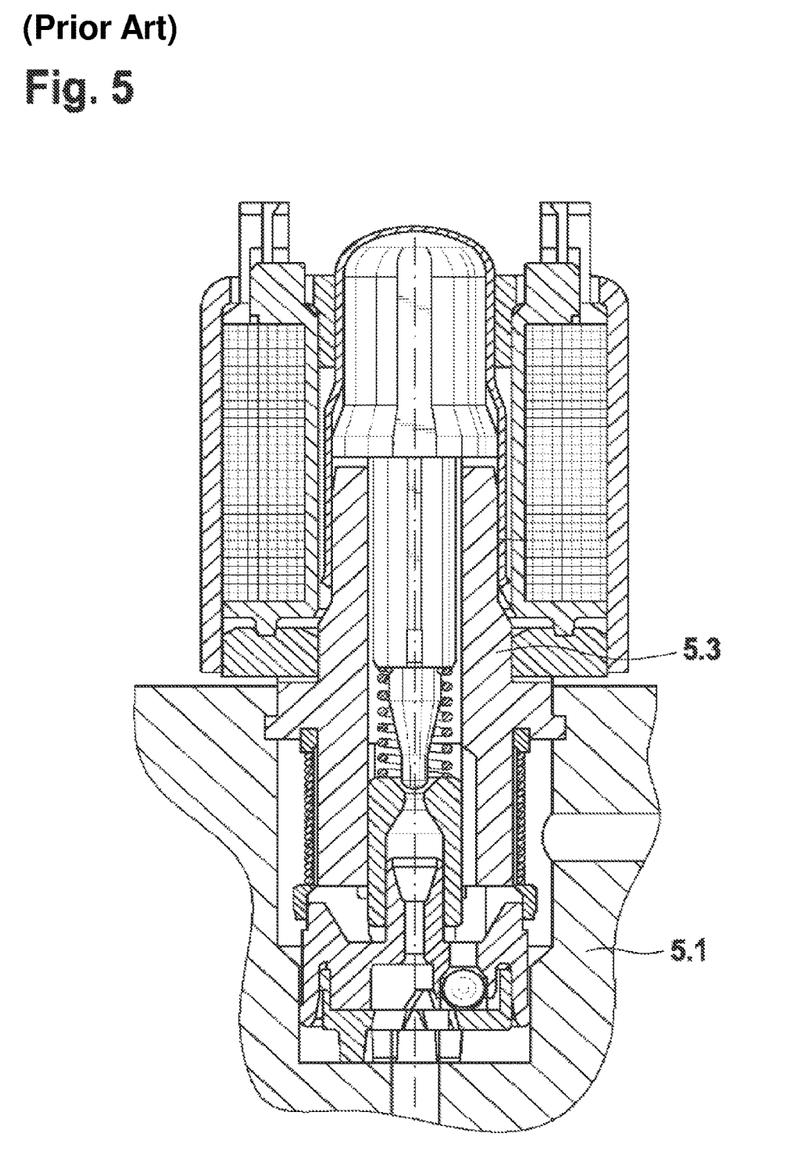
FIG. 5 shows a solenoid valve according to the state of the art.

A conventional solenoid valve, particularly one intended for use in antilock braking systems (ABS) or electronic stability program systems (ESP), as shown in FIG. 5, comprises a valve receiving device 5.1, in which the valve insert 5.3 of the solenoid valve MV is received. The forces occurring in operation are dissipated into the valve receiving device 5.1 by calked areas of the valve insert 5.3. The system is sealed through the use of a valve lower part, in FIG. 5 a plastic insert, which is inserted into the end of the valve insert received by the valve receiving device. The plastic insert therefore serves to insulate against the pressure forces occurring and forms a seal against the valve receiving device. Furthermore a nonreturn valve is incorporated in the plastic insert. Such a device is disclosed, for example, by DE 10 2005 044 673 A1.

These conventional devices, however, are not fully capable of sealing off the pressure forces occurring in both directions. This is necessary, for example, where the valve is used as an isolating valve in antilock braking systems or electronic stability program systems.

The large number of individual components moreover increases the manufacturing costs and fitting is both time consuming and costly.

It is therefore desirable to provide an improved solenoid valve device, which solves at least some of the aforementioned problems and leads to an increased pressure resistance in both directions.

SUMMARY

This object is achieved by a solenoid valve device having the features of the disclosure.

A solenoid valve device according to one embodiment of the disclosure comprises a valve receiving device and a valve insert of a solenoid valve which is received in the valve receiving device. The solenoid valve device further comprises pressure means in order to press the valve insert against the valve receiving device.

Pressing the pressure means into the valve insert serves to press the valve insert against the valve receiving device and therefore affords a frictional bearing contact of the valve insert outside wall against the inside wall of the valve receiving device. The valve insert and therefore the solenoid valve can therefore be firmly connected to the valve receiving device. A high pressure resistance in both directions is also achieved without the use of additional components, such as a plastic insert.

The pressure means preferably comprises a valve body of the solenoid valve introduced into the valve insert under stress. Here the frictional connection of the valve insert to the valve receiving device and the high pressure resistance in both directions can be achieved without the use of additional components The pressure means may further comprise an axial filter of the solenoid valve introduced into the valve insert under stress. This affords the advantage of simultaneous sealing and filtering by pressing in only one component. At the same time, pressing the axial filter in further reduces the overall height.

The outside diameter of the pressure means or the valve body is advantageously slightly greater than the inside diameter of the valve insert.

A further embodiment comprises a solenoid valve device having a valve receiving device and a valve insert of a solenoid valve which is received in the valve receiving device. The valve insert has a notch, in which a sealing element is received.

The sealing element, which is situated between the valve insert and the valve receiving device, leads to a further increase in the pressure resistance and sealing effect in both directions. This is achieved in conjunction with a simultaneous reduction in the number of components compared to the state of the art.

In a further embodiment of the solenoid valve device an axial filter is introduced axially between the valve receiving device and the valve insert, wherein the valve insert and the axial filter are spaced at an axial distance from one another, and sealing element is introduced between the axial filter and the valve insert.

Also, in this embodiment the sealing area is incorporated in the valve insert, a greater sealing effect is achieved through the use of the sealing element, and a high pressure resistance in both directions is ensured. At the same time the production and assembly outlay is reduced to a minimum.

An additional axial filter is advantageously introduced axially between the valve receiving device and the valve insert, which allows filtering before the flow passes through the valve.

Furthermore, a compression spring seat is advantageously provided inside the valve insert. The compression spring acts on the compression spring seat. The compression spring is therefore no longer situated in the flow area of the fluid that flows through the solenoid valve. This serves to reduce the flow resistance and the spring load and results in less wear.

DETAILED DESCRIPTION

Preferred embodiments of the present disclosure are described in detail below with reference to the drawings attached. Here, in the various drawings, identical or corresponding components are each denoted by the same or similar reference numerals.

According to one embodiment of the disclosure the solenoid valve device comprises a valve receiving device and a valve insert of a solenoid valve which is received in the valve receiving device. The solenoid valve device further comprises pressure means in order to press the valve insert against the valve receiving device and thus to press the valve insert and seal it off against the valve receiving device.

FIG. 1 shows a solenoid valve device MVV according to one embodiment of the disclosure, in which the pressure means is embodied as a valve body 1.5. Here a valve receiving device 1.1 and a solenoid valve MV are provided. The solenoid valve MV comprises a valve insert 1.3, which is introduced by one end into the valve receiving device 1.1. The valve body 1.5 is pressed into the valve insert 1.3, which presses the valve insert 1.3 together with the valve receiving device 1.1. For example, the valve body 1.5 may be designed so that the outside diameter of the valve body 1.5 is slightly greater than the inside diameter of the valve insert 1.3 and the point at which the valve body is to be pressed in, which may lead to a slight expansion of the valve insert. In order make pressing in even easier, the inside face of the valve insert may have an axial area conically tapering together. A tappet 1.7, which is connected to an armature 1.9, is introduced into the valve insert 1.3. A compression spring 1.6 is introduced between the valve body 1.5 and the tappet 1.7. Energizing of the coil 1.11 arranged around the armature 1.9 causes the compression spring 1.6 to be compressed and the tappet 1.7 inside the valve insert is pressed on to the valve body 1.5 against the force of the compression spring. The solenoid valve MV is therefore closed and affords sealing in both directions of flow. Opening of the compression spring is achieved by the force of the compression spring. In principle an arrangement for a normally closed valve is also feasible.

Furthermore, an additional axial filter 1.2, which is pressed on to the valve insert, may be provided.

In the example in FIG. 1 the solenoid valve MV or the valve insert 1.3 is pressed together with the valve receiving device 1.1 by pressing in the valve body 1.5. A frictional connection of the valve insert to the valve receiving device 1.1 is thereby established and a highly resistant sealing is achieved in both directions of flow. An additional connection of the valve insert 1.3 to the valve receiving device 1.1 by means of a calked area, as in the state of the art, is therefore not necessary. It is also feasible to press in other components, such as an axial filter 1.4, for example, in which case the pressure means may be slightly oversized in relation to the point of the valve insert at which the pressure means is to be pressed in.

Figure 1A:
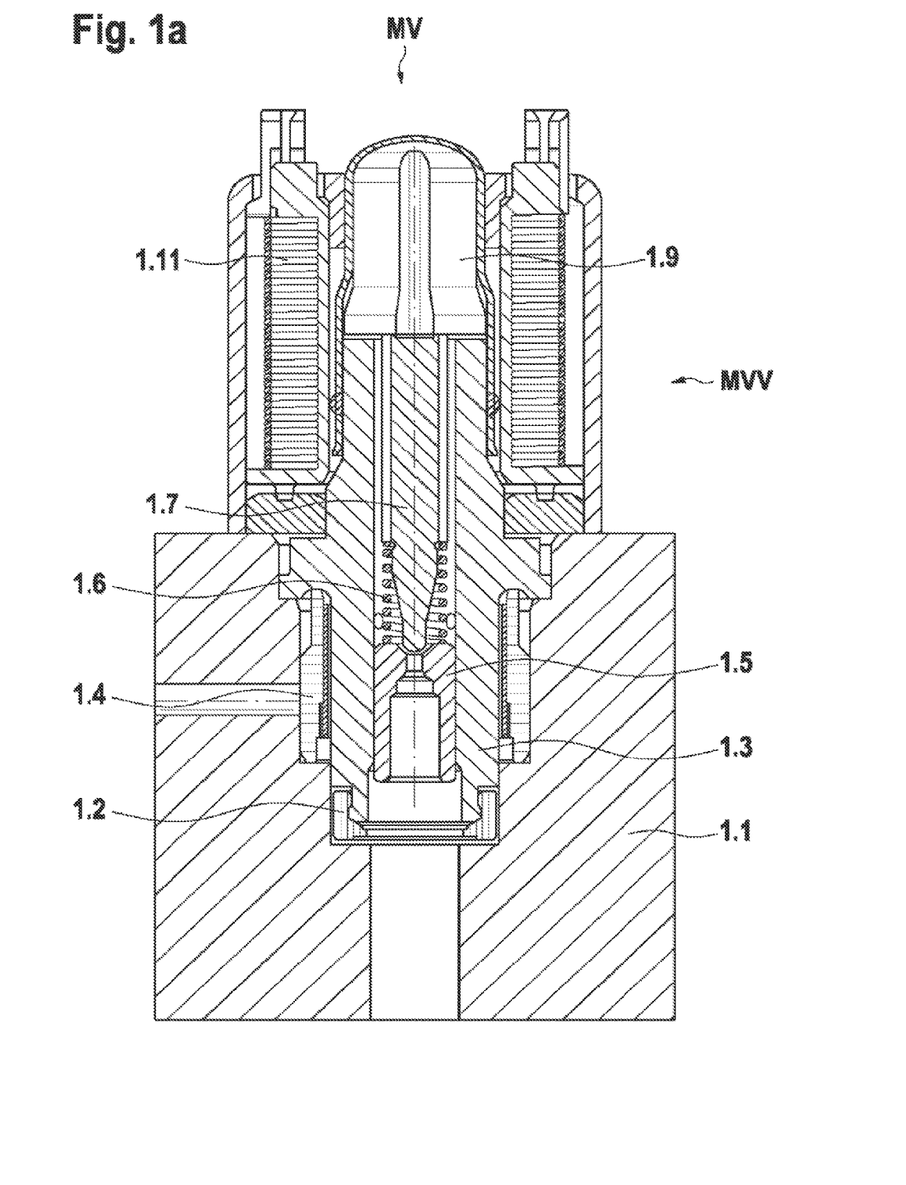
FIG. 1 shows a solenoid valve device according to a special embodiment of the disclosure, which represents a valve body as pressure means.
Figure 1B:
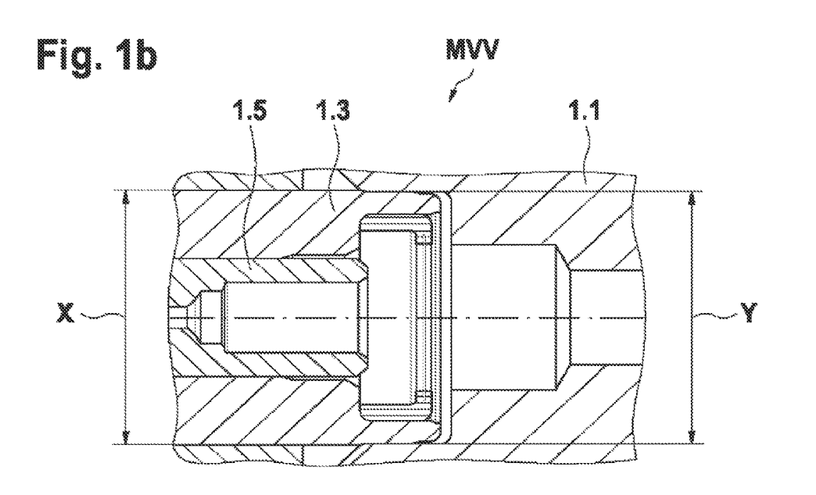
Figure 1C:
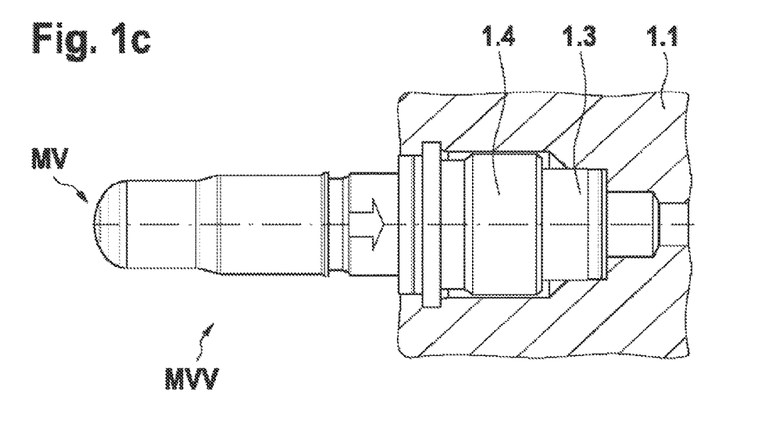
Figure 1D:
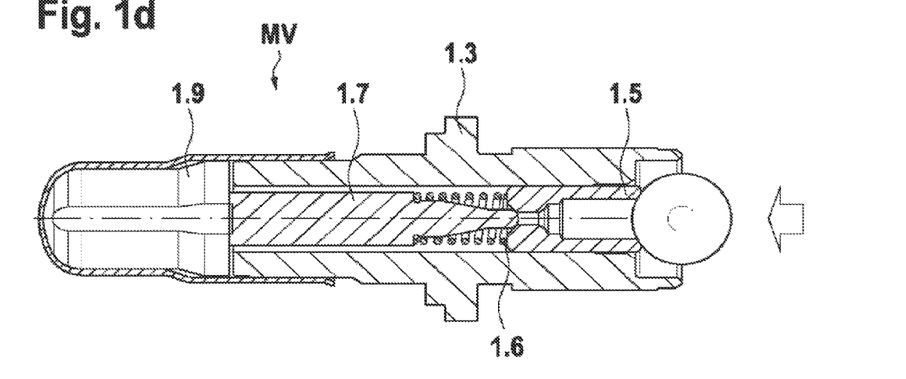
Figure 1E:
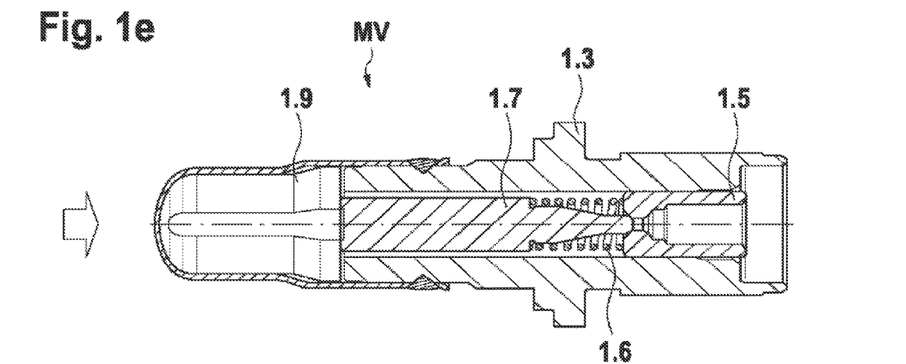
Figure 1F:
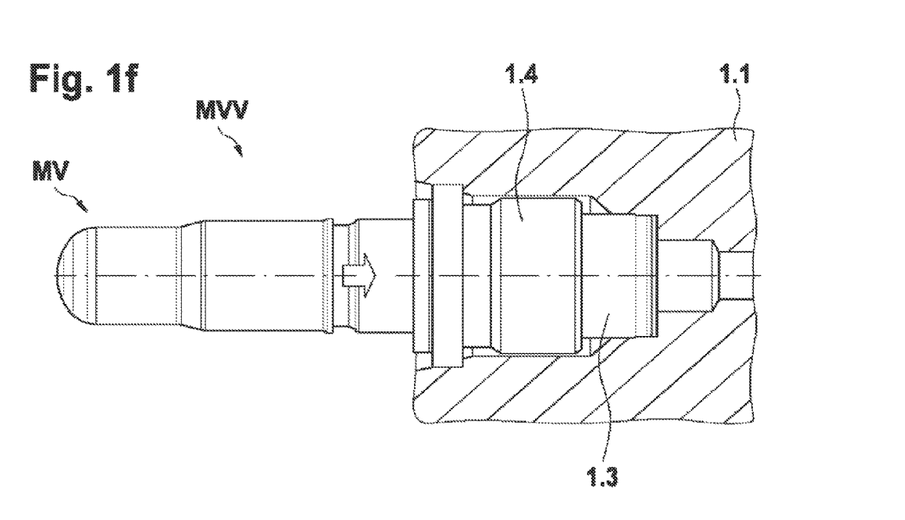
Figure 1G:
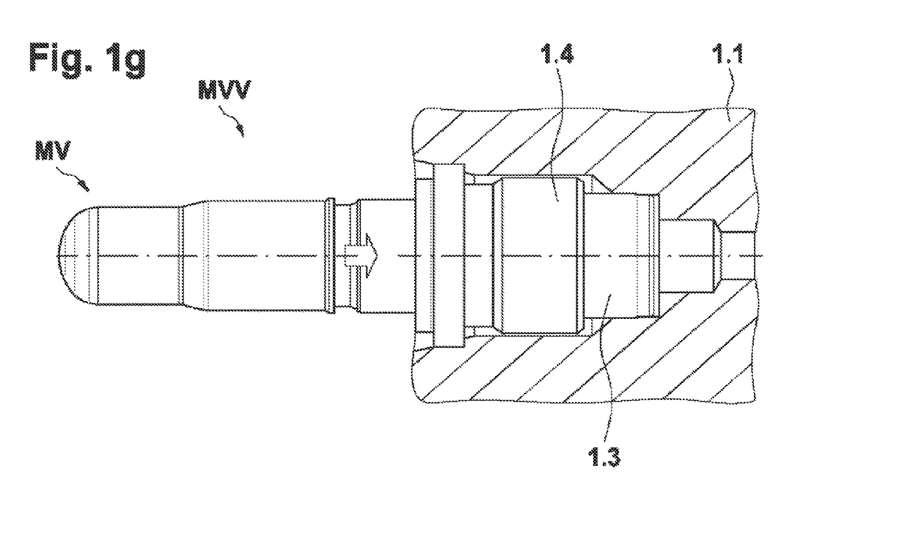
Figure 2:
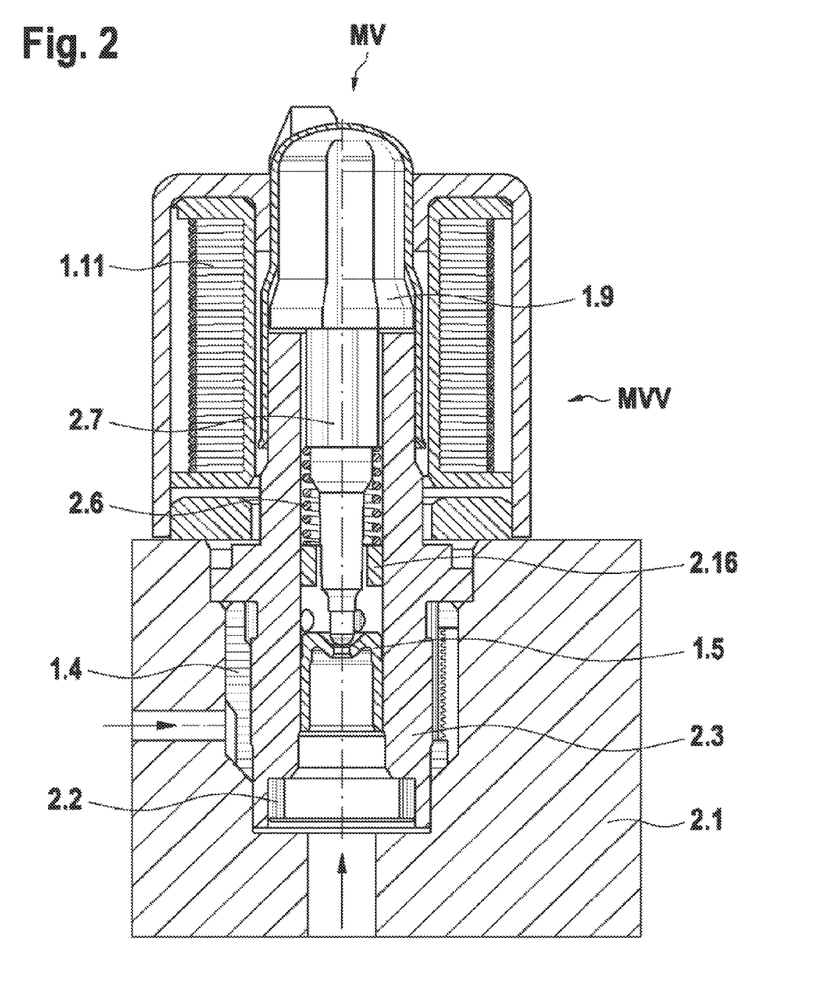
FIG. 2 shows a solenoid valve device according to a further special embodiment of the disclosure, which among other things represents an additional spring seat.

FIG. 2 shows a further embodiment of the solenoid valve device according to the disclosure. An additional axial filter 2.2 is pressed into the end of the valve insert introduced into the valve receiving device. A frictional pressing of the valve insert 2.3 against the valve receiving device 2.1 is produced by a slight expansion of the valve insert 2.3. Here the axial filter can be designed so that the outside diameter is slightly greater than the inside diameter of the valve insert 2.3 at the end penetrating into the valve receiving device 2.1. Furthermore, the inside wall of the valve insert at the end penetrating into the valve receiving device may have a tapering profile of the inside wall, and the axial filter 2.2 may have a tapering profile of the outside wall. This makes it easier to press the axial filter 2.2 into the valve insert.

Furthermore, as shown in FIG. 2, an additional seat 2.16 may be provided inside the valve insert 2.3. The compression spring 2.6 is now situated between the compression spring seat 2.16 and the tappet 2.7. The compression spring 2.6 therefore lies outside the flow area of the fluid. This leads to a reduction of the flow resistance and reduces the load and wear of the compression spring 2.6. The compression spring seat 2.16 may be embodied either as a pressed-in ring, or as part of the valve insert, for example in the form of a projection.

Pressing the valve insert 2.3 against the valve receiving device 2.1 affords a sealing of the valve in both directions of flow and increases the pressure resistance. The frictional connection of the valve insert 2.3 and the valve receiving device 2.1 is achieved without a valve lower part or calked flange.

Figure 3:
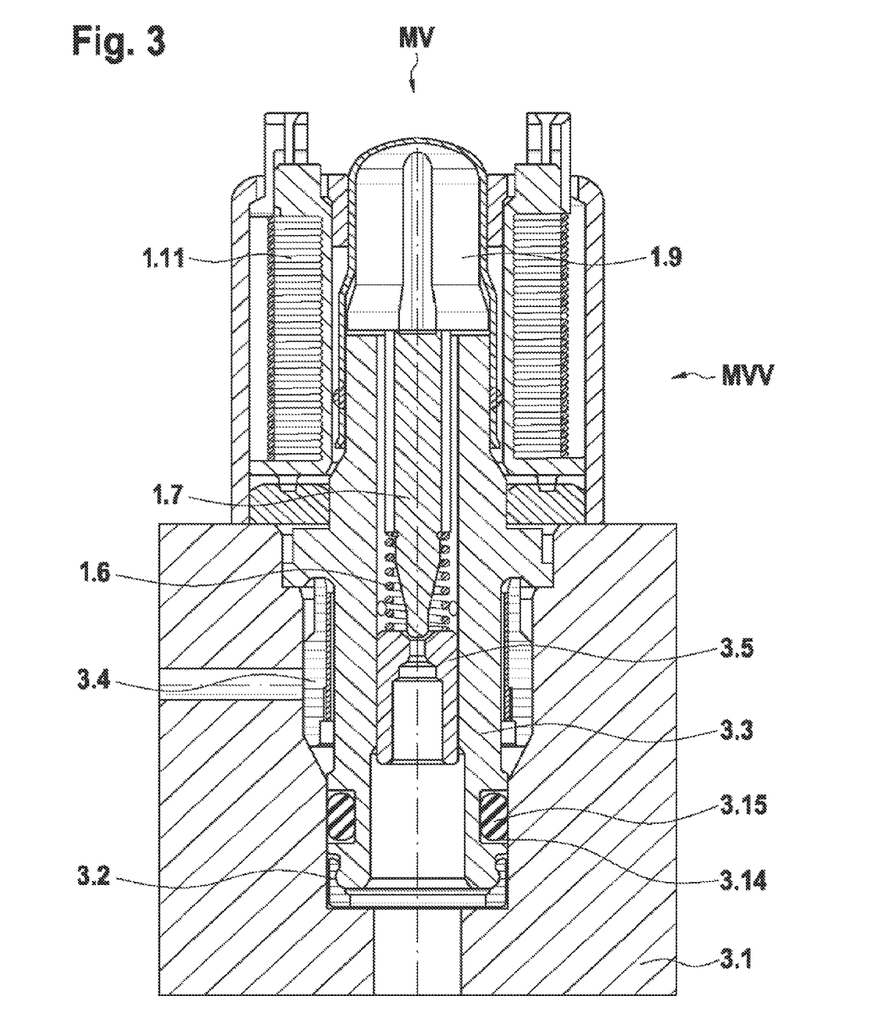
FIG. 3 shows a solenoid valve device according to a further special embodiment of the disclosure, which comprises a sealing element in a notch of the valve insert.

FIG. 3 shows a further exemplary embodiment of the disclosure. Here the valve insert 3.3 is pressed into the valve receiving device 3.1. The valve insert 3.3 is designed so that on the outside it has a notch 3.14 at the end into introduced into the into the valve insert. A sealing element 3.15, which may be embodied as an elastomer sealing element, for example, is fitted in the notch 3.14. This forms a seal between the valve insert and the valve receiving device and is preferably situated axially between the valve inlets. The sealing area is therefore incorporated directly in the valve insert 3.3. This leads to a further increase in the sealing effect and the pressure resistance in both directions of flow.

Besides the press-fit, obtained through a slight oversize of the valve insert, for example, the pressure of the valve insert 3.3 against the valve receiving device 3.1 can also be achieved by pressing a pressure means into the valve insert. In FIG. 3, for example, the valve body 3.5 may be pressed into the valve insert, thereby affording a frictional connection of the valve insert to the valve receiving device 3.1. It is also possible to introduce an additional axial filter 3.2, or a radial filter 3.4. It is furthermore feasible to incorporate a compression spring seat, as represented in FIG. 2, in a valve device according to the embodiment in FIG. 3.

Figure 4:
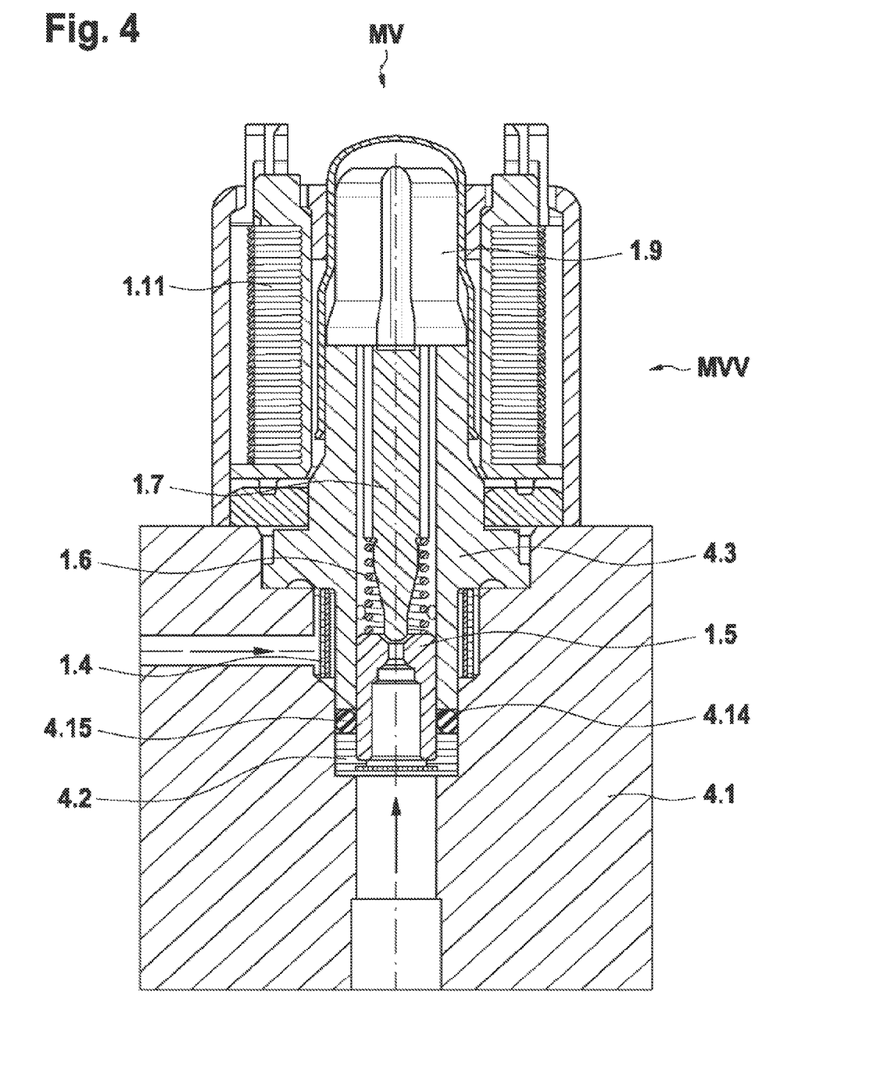
FIG. 4 shows a solenoid valve device according to a further special embodiment of the disclosure, which comprises an additional axial filter and a sealing element.

The exemplary embodiment represented in FIG. 4 shows a separation of an additional axial filter 4.2 from the valve insert 4.3 introduced into the valve receiving device 4.1. A sealing element 4.15, which may be embodied as an elastomer sealing element, for example, can therefore be introduced between the axial filter 4.2 and the valve insert 4.3. In this exemplary embodiment also, therefore, the sealing area 4.14 is incorporated in the valve insert 4.3. A high pressure resistance in both directions can therefore be achieved without the use of additional components and for a minimal machining and manufacturing cost of the valve insert. Besides a press-fit, the valve insert 4.3 can also be pressed into the valve receiving device 4.1, for example, through the introduction of a pressure means.

The embodiments represented here therefore afford sealing in both directions of flow and high pressure resistance, whilst at the same time minimizing the manufacturing costs and the effort involved in fitting. Furthermore, by eliminating a valve lower part it is also possible substantially to reduce the overall height of the solenoid valve device.

In particular, the solenoid valve device MVV is suitable for use in a hydraulic unit, which is used, for example, in an antilock braking system (ABS) or an electronic stability program system (ESP).

Figure 6:
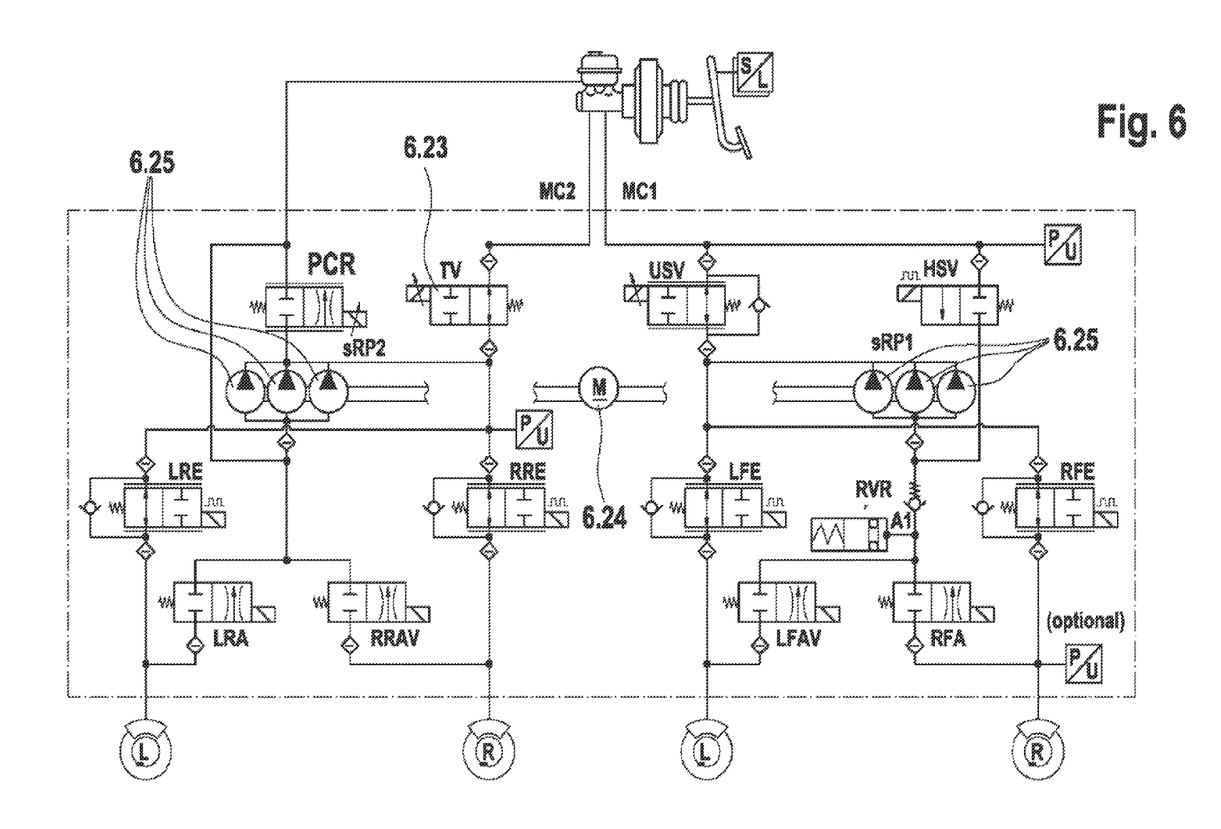
FIG. 6 shows a circuit diagram of a braking system, which comprises an isolating valve according to one of the embodiments of the present disclosure.

FIG. 6 represents a braking system. The solenoid valve device MVV having a solenoid valve MV may be used as an isolating valve 6.23, for example. This isolating valve 6.23 separates the high-pressure area of the braking system from the low-pressure area. The system further comprises other valves for controlling and distributing the brake pressure between the left-hand and right-hand front and rear wheels, together with a plurality of hydraulic pumps 6.25, which are operated by a motor 6.24 for regulating the brake pressure.

The person skilled in the art will appreciate from the foregoing description that various modifications and variants of the valve device can be implemented without departing from the scope of the disclosure.

Furthermore, the disclosure has been described with reference to specific examples, which serve merely for a better understanding of the disclosure, however, and are not intended to limit the disclosure.

The invention claimed is:

1. A solenoid valve device, comprising:
    a valve receiving device;
    a valve insert of a solenoid valve which is received in the valve receiving device; and
    a pressure mechanism configured to press the valve insert against the valve receiving device,
    wherein the pressure mechanism comprises a valve body of the solenoid valve introduced into the valve insert under stress, and
    wherein the valve body is configured to press the valve insert against the valve receiving device to produce a frictional connection between the valve insert and the valve receiving device.

2. The solenoid valve device as claimed in claim 1, wherein the pressure mechanism further comprises an axial filter of the solenoid valve introduced into the valve insert under stress.

3. The solenoid valve device as claimed in claim 2, wherein an outside diameter of the axial filter is slightly greater than an inside diameter of the valve insert.

4. The solenoid valve device as claimed in claim 1, wherein an outside diameter of the valve body is slightly greater than an inside diameter of the valve insert.

5. The solenoid valve device as claimed in claim 1, further comprising an axial filter axially located between the valve receiving device and the valve insert.

6. The solenoid valve device as claimed in claim 1, further comprising a compression spring and a compression spring seat on which the compression spring acts, the compression spring seat being provided inside the valve insert.

7. The solenoid valve device as claimed in claim 1, wherein the valve insert has a tapering inside diameter.

8. The solenoid valve device as claimed in claim 1, further comprising a sealing element introduced between the valve insert and the valve receiving device.

9. The solenoid valve device as claimed in claim 1, wherein the pressure mechanism is configured to press the valve insert radially outwardly against the valve receiving device.

10. The solenoid valve device as claimed in claim 1, wherein the valve body is configured to press the valve insert radially outwardly against the valve receiving device.

11. A solenoid valve device, comprising:
    a valve receiving device,
    a valve insert of a solenoid valve which is received in the valve receiving device,
    an axial filter axially located between the valve receiving device and the valve insert, the valve insert and the axial filter being spaced at an axial distance from one another, and
    a sealing element positioned between the axial filter and the valve insert.

12. The solenoid valve device as claimed in claim 11, wherein the sealing element is an elastomer sealing element.

13. The solenoid valve device as claimed in claim 11, wherein the sealing element is interposed axially between the axial filter and the valve insert.

* * * * *